United States Patent [19]

Heinbockel et al.

[11] 4,283,275

[45] Aug. 11, 1981

[54] APPARATUS FOR PROCESSING WASTE PAPER

[75] Inventors: Wolfgang Heinbockel, Weingarten; Wolfgang Siewert, Ravensburg-Weingartshof; Albrecht Kahmann, Weingarten; Gerhard Lambrecht, Staig-Fronreute, all of Fed. Rep. of Germany

[73] Assignee: Escher Wyss GmbH, Ravensburg, Fed. Rep. of Germany

[21] Appl. No.: 137,601

[22] Filed: Apr. 7, 1980

[30] Foreign Application Priority Data

May 4, 1979 [CH] Switzerland .................... 4190/79

[51] Int. Cl.³ .......................................... D21D 5/04
[52] U.S. Cl. .................................... 209/3; 209/17; 209/234; 209/273; 209/358; 162/4; 162/55; 241/46.17; 241/20; 241/24; 241/28
[58] Field of Search ............... 241/46.13, 46.11, 46.17, 241/20, 21, 24, 28; 209/17, 12, 10, 234, 250, 273, 358, 359, 3; 162/4–6, 55

[56] References Cited

U.S. PATENT DOCUMENTS

| | | | |
|---|---|---|---|
| 2,033,123 | 3/1936 | Cowles | 241/69 X |
| 3,942,728 | 3/1976 | Christ et al. | 209/211 X |
| 4,127,479 | 11/1978 | Kurth et al. | 209/306 X |
| 4,129,259 | 12/1978 | Vokes | 209/250 X |

FOREIGN PATENT DOCUMENTS

| | | | |
|---|---|---|---|
| 2757580 | 7/1978 | Fed. Rep. of Germany | 162/4 |
| 2757581 | 5/1979 | Fed. Rep. of Germany | 162/4 |

Primary Examiner—Ralph J. Hill
Attorney, Agent, or Firm—Werner W. Kleeman

[57] ABSTRACT

An installation for processing waste paper containing a stock pulper or slusher equipped with a rotor and two sieves or screens having different size holes or openings. By means of the sieve having the larger size openings there is conducted the obtained stock suspension through a primary line system which, for instance, leads to a papermaking machine. Cooperating with the sieve having the larger size openings or holes is an auxiliary circulation circuit containing a device for the removal of contaminants or rejects. There is preferably arranged at the auxiliary circulation circuit or system a separator for heavy contaminants or rejects, a pump, a secondary stock pulper or fiberizer and a sieve or filtering device.

8 Claims, 2 Drawing Figures

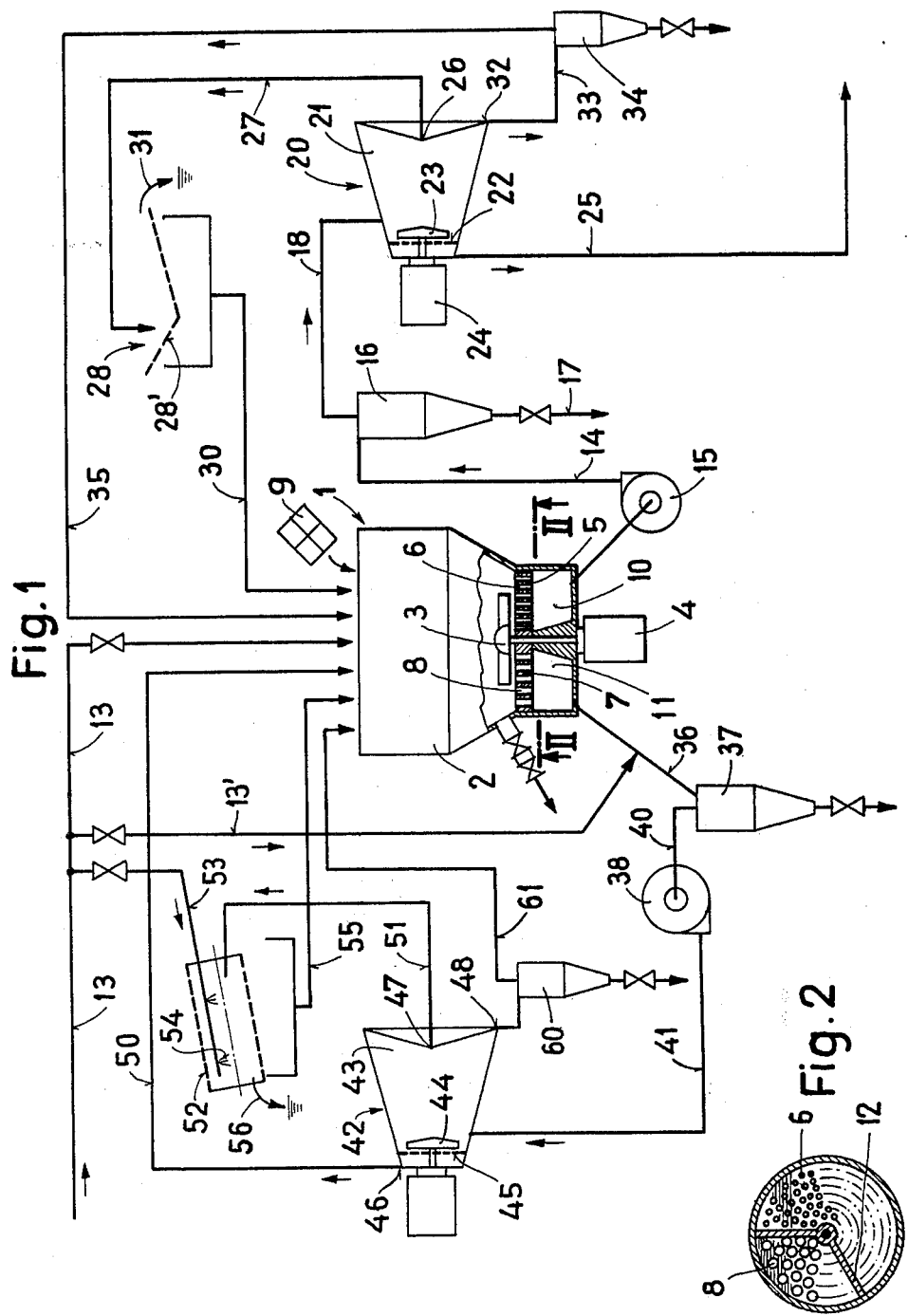

APPARATUS FOR PROCESSING WASTE PAPER

BACKGROUND OF THE INVENTION

The present invention relates to a new and improved construction of apparatus or installation for processing waste paper.

Generally speaking, the waste paper processing apparatus of the present development is of the type comprising a stock pulper equipped with a housing containing therein a rotor and a sieve or screen plate located at the region of the rotor. The sieve plate is provided with openings through which the liquid stock suspension, formed during pulping and slushing of the waste paper, is removed for further treatment and processing at a papermaking machine.

An installation of this type is disclosed, by way of example, in German Pat. No. 2,757,580. With this prior art waste paper processing installation, the stock suspension, obtained by defiberizing the waste paper, is withdrawn through the sieve or screen plate and, following removal of heavy rejects or contaminants, is infed to a secondary stock pulper. In this secondary stock pulper, containing a rotor movable about a sieve, there is further refined the stock suspension, whereupon the good stock is withdrawn through the sieve for further treatment and use. In the secondary pulper there are removed and separated light rejects or contaminants, such as for instance plastic parts and plastic foils, by means of a special outlet leading from the center of a vortex core of the secondary pulper.

The heretofore installation is afflicted with the drawback that the light rejects, such as the aforementioned plastic foils, prior to their separation are comminuted relatively intensely. This, in turn, constitutes an unuseful expenditure in both time and energy. Also, there exists the danger of clogging the relatively small openings or holes of the sieve or screen plate of the stock pulper.

SUMMARY OF THE INVENTION

Therefore, with the foregoing in mind it is a primary object of the present invention to provide a new and improved apparatus for processing waste paper which is not afflicated with the aforementioned drawbacks and limitations of the prior art constructions.

Another and more specific object of the present invention aims at improving upon the heretofore known waste paper processing installation, and specifically with the objective of enabling separation of undesired constituents, especially the aforementioned plastic foils and also other areal parts or elements, particularly those which are insoluble in water, prior to their intensified comminution or size reduction.

A further object of the invention is to devise an apparatus for processing waste paper which also renders possible early removal of heavy contaminants or rejects.

In keeping with the aforementioned objectives, the invention further is intended to provide an apparatus for processing waste paper which, on the one hand, affords saving in comminution energy and, on the other hand, also appreciably improves upon the mode of operation of the waste paper processing apparatus.

Now in order to implement these and still further objects of the invention, which will become more readily apparent as the description proceeds, the waste paper processing apparatus or installation of the present development is manifested by the features that, there is located at the region of the rotor a second sieve or screen plate or equivalent structure, whose openings or holes are larger than the size of the openings of the first sieve or screen plate. In flow communication with the second sieve plate having the large size openings is a line or conduit of an auxiliary circulation circuit or system which leads back to the stock pulper and at which there is arranged at least one device for the removal of undesired constituents out of the stock suspension.

Due to the removal of coarser contaminants which are insoluble in water, from the stock pulper, through the larger openings of the second sieve plate, there is rendered possible the separation of such water insoluble contaminants before they are further comminuted or reduced in size in the stock pulper or, in fact, in the subsequently arranged secondary pulper or fiberizer. This comminution requires an additional expenditure in work and, furthermore, renders more difficult the separation of the thus obtained small particles from the stock suspension or liquid.

The device for the removal of undesired constituents from the stock suspension may be a sieve or filter device which is arranged at the auxiliary circulation system or circuit.

Preferably, the sieve or filter device of the auxiliary circulation circuit can be constituted by a secondary pulper or fiberizer having a rotor which is movable about a sieve or screen. This secondary pulper or fiberizer is provided with outlets for good stock passing through the sieve or screen, for light contaminants or rejects and for heavy contaminants or rejects. This seconday stock pulper, which can be equipped with a sieve or screen possessing larger openings or holes, than those of the previously mentioned secondary pulper arranged at the main line, on the one hand causes, by virtue of the action of its turbulent field, a good separation of rejects or contaminants and, additionally, also enables a subsequent defiberizing of paper shreds or pieces or the like which, together with the foil pieces, have reached the auxiliary circulation system.

In the auxiliary circulation system or circuit there can be arranged forwardly of the secondary pulper a separator for heavy rejects. By virtue of this arrangement there is beneficially realized a rapid separation of the heavy rejects or contaminants, such as, for instance, stones and rocks and metal parts, thereby protecting downstream arranged components of the waste paper processing installation.

At the light weight constituent outlet of the secondary pulper there can be connected a sieve or filtering device for separating large surface light rejects, and the good stock obtained at the sieves or filters can be recycled back to the stock pulper. With this technique and system design it is possible to further increase the yield of usable fibers, since prior to separation of the areal or extended or surface-like contaminants, such as plastic foils, there can be removed therefrom any paper fibers which possibly have adhered thereto.

The auxiliary circulation circuit can be provided with a connection line for the infeed of dilution water. By virtue of the thus obtainable increased dilution it is possible to augment the mode of operation of the different refining devices.

Preferably, there can be connected into the line of the auxiliary circulation system, between the separator for the heavy rejects and the secondary pulper, a circulation pump for feeding the suspension to the secondary pulper. The connection line for the dilution water is connected at the line of the auxiliary circulation circuit, viewed in the flow direction, forwardly of the separator for the heavy contaminants or rejects. With such type of arrangement there is realized the advantage that the dilution water is infed at a location where there is effective the negative pressure or vacuum of the suction line or conduit of the circulation pump. Moreover, at the same time there can be improved the mode of operation of the separator by the action of the dilution water and, on the other hand, the circulation pump is protected by the separator against damage due to heavy rejects or contaminants.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic showing of a waste paper processing apparatus or installation according to the invention;

FIG. 2 is a schematic sectional view of part of the arrangement of FIG. 1, taken substantially along the line II—II thereof.

DETAILED DESCRIPTION OF THE PREFERRED EMBODIMENTS

Describing now the drawings, in FIG. 1 there is illustrated an exemplary embodiment of apparatus or installation for processing waste paper, which will be seen to comprise a stock pulper or slusher 1. The stock pulper 1 embodies a container 2 within which there is arranged a rotor 3 which is driven by a suitable drive motor 4. At the not particularly referenced base or floor of the container and at the region of the rotor 3 there is located a first sieve or screen plate 5 having smaller holes or openings 6 and a second sieve or screen plate 7 having larger holes or openings 8. The openings or holes 6 can have, for instance, a diameter of about 20 millimeters, the other openings or holes 8 a diameter of about 70 millimeters, by way of example.

Below the sieve or screen plate 5 there is arranged a removal chamber or compartment 10, and below the sieve or screen plate 7 a removal chamber or compartment 11. Both of the chambers 10 and 11 are separated from one another by a partition or separation wall 12 or equivalent structure, as particularly well seen by referring to FIG. 2.

Water can be introduced into the container 2 of the stock pulper 1 by means of a water infeed line or conduit 13. Additionally, there is inserted into the container 2 bales 9 of waste paper.

Leading out of the chamber 10 of the stock pulper 1 is a line or conduit 14 provided wih a pump 15. The line or conduit means 14 leads to a separator 16 from which there can be eliminated the heavy rejects or contaminants by means of a line or conduit 17 or equivalent structure.

A line or conduit 18, through which there is conveyed the stock suspension or solution freed of the heavy rejects or contaminants, leads from the separator 16 to a secondary pulper or fiberizer 20. The secondary pulper 20, which may be structured for instance in the manner taught in U.S. Pat. No. 3,942,728, granted Mar. 9, 1976, of Alfred Christ et al., contains within its housing 21 a sieve or screen 22 around which there is movable a rotor 23 which, in turn, is driven by any suitable drive motor 24. The good or accept stock obtained in the secondary pulper 20 passes through the sieve or screen 22, through an outlet line or conduit 25 in order to be further treated and processed in a suitable papermaking machine. The secondary pulper 20 has an outlet 26 for light rejects or contaminants, such as, for instance, plastic foils and plastic parts or elements. A line or conduit 27 is connected with the outlet 26 of the secondary pulper 20, this line 27 leading to a dynamic jarrer or vibrator 28 or equivalent structure. Paper fibers which are passed through the sieve or screen 28' of the dynamic jarrer or vibrator 28, are recycled by means of a line 30 back into the stock pulper 1. The large surface parts, retained upon the sieve or screen 28', are separated out, as the same has been symbolically indicated by the arrow 31.

Additionally, the secondary pulper 20 contains an outlet 32 for the heavy rejects, with which there is flow connected, by means of a line or conduit 33, a hydrocyclone 34. The suspension freed of the heavy rejects or parts, effluxing from the hydrocyclone 34, arrives by means of a line 35 likewise back into the stock pulper 1.

The stock suspension which arrives in the chamber or compartment 11, through the second sieve or screen plate 8 which is provided according to the teachings of the invention, is infed through a line or conduit 36 to a separator 37. Merging with the line or conduit 36 is a line 13' through which there is infed dilution water. By means of a pump 38 there is sucked-out of the separator 37, by means of the suction line or conduit 40 of such pump 38, the stock suspension which has now been freed of the heavy rejects or constituents. This stock suspension then is infed by means of a feed or conveying line 41 to a secondary pulper or fiberizer 42. The secondary pulper 42, which essentially can be constructed in the same manner as the secondary pulper 20 discussed above, contains a container 43, a rotor 44, a sieve or screen 45, an outlet 46 for good stock, an outlet 47 for light rejects, and an outlet 48 for heavy rejects. Leading back into the container 2 of the stock pulper 1 from the outlet 46 for the good stock is a line or conduit 50. A line or conduit 51 leads from the outlet 47 for the light rejects or contaminants to a rotating sieve or screen which is provided with a flushing water line or conduit 53 equipped with spray nozzles 54 or equivalent structure. The flushing water line or conduit 53 is connected with the line or conduit 13. The fiber material which passes through the sieve or screen 52 is recycled, by means of a return line 55, back into the container or housing 2 of the stock pulper 1.

During operation, the lines or conduits 14, 18 and 25, extending between the stock pulper 1 and the secondary pulper 20 and out of the latter, as shown quite clearly in FIG. 1, constitute the primary line or conduit arrangement for the processing of the substance obtained from the waste paper. The lines 36, 40, 41 and 50 form an auxiliary circulation system or circuit, which starts at the sieve or screen plate 7 having the larger holes or openings 8 and again leads back into the container 2 of the stock pulper 1.

One of the most important tasks assigned to this auxiliary circulation system or circuit is the separation of coarse contaminants or rejects, for instance plastic foils, before such are excessively comminuted, which otherwise would result not only in an unuseful expenditure in energy but would render the elimination thereof more difficult. Markedly comminuted or size reduced foil particles are much more difficult to eliminate from the stock suspension than the coarser parts. In principle, there could be used for this purpose a sieve or screening device in the nature of the dynamic jarrer or vibrator 28 or a rotating sieve or screen 52.

With the preferred embodiment as shown in FIG. 1, there is employed for the separation of the surface-like or areal contaminants the secondary pulper 42. This secondary pulper 42 affords the advantage that pieces of not completely defiberized paper can be further comminuted or reduced in size therein, and thus, are not eliminated together with the foil pieces. These foil pieces, which are not essentially further reduced in size by the action of the rotor 44, pass through the line or conduit 51 to the sieve or screen 52 and are separated-out at such sieve 52, as has been symbolically indicated by the arrow 56. Paper fibers which adhere to the foil pieces are flushed away by the spray nozzles 54 or equivalent structure and are introduced through the line 55 into the container 2.

In order to insure for the circulation of the stock suspension through the lines 36, 40, 41 and 50 of the auxiliary circulation system or circuit, the pump 38 is advantageously arranged forwardly of the secondary pulper 42. Between this pump 38 and the pulper 2 there is connected the separator 37 for the heavy rejects or contaminants, thereby protecting the pump 38 and the secondary pulper 42 against damage and against undesirable wear. The dilution line or conduit 13' is assigned the task of diluting the stock suspension which enters the auxiliary circulation system, in a manner such that this stock suspension can be better processed by the devices connected in the auxiliary circulation system, particularly the separator 37, the secondary pulper 42 and the rotating sieve or screen 52. Thus, for instance, by way of example and not limitation, according to one practical embodiment the stock suspension which has been infed from the stock pulper 1 to the auxiliary circulation system is diluted from a stock suspension density of about 4% to a stock suspension density of about 2% which in the case under consideration has been found to be optimum.

Through the practise of the inventive measures there is also avoided, or at the very least reduced, the likelihood that there will arise the heretofore discussed danger of coating or clogging the holes or openings 6 of the sieve or screen plate 5. The coarser, for instance, surface-like or areal parts are namely withdrawn through the larger holes or openings 8 of the sieve plate 7, before they can clog the smaller openings 6 of the sieve plate 5.

As best seen by referring to FIG. 1, the secondary pulper 42 of the auxiliary circulaton system can be provided with a hydrocyclone 60 at its outlet 48 for the heavy rejects. The line or conduit 61, leading from the hydrocyclone 60, and carrying the fiber stock suspension freed of the heavy rejects, can be returned back to the stock pulper 1.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for the processing of waste paper, comprising:
   a stock pulper provided with a container means;
   a rotor arranged within said container means of said stock pulper;
   a first sieve plate having holes and located at the region of said rotor;
   the liquid stock suspension formed by defiberizing the waste paper passing through the holes of said first sieve plate for further treatment and processing in a paper-making machine;
   a second sieve plate provided with holes and arranged at the region of sid rotor within said container means of said stock pulper;
   the holes of said second sieve plate being larger in size than the holes of said first sieve plate;
   an auxiliary circulation system containing line means operatively connected with the larger holes of said second sieve plate;
   said line means leading back to said stock pulper; and
   at least one device provided for said auxiliary circulation system for the removal of undesired constituents from said stock suspension.

2. The apparatus as defined in claim 1, wherein:
   said at least one device comprises a sieve device arranged at said auxiliary circulation system.

3. The apparatus as defined in claim 1, wherein:
   said at least one device comprises a secondary pulper arranged at said auxiliary circulation system;
   said secondary pulper comprising:
   sieve means;
   a rotor movable with respect to said sieve means; and
   respective outlet means for good stock passing through said sieve means, for light rejects and for heavy rejects.

4. The apparatus as defined in claim 3, wherein:
   said at least one device further comprises separator means for the heavy rejects arranged forwardly of the secondary pulper in the auxiliary circulation system.

5. The apparatus as defined in claim 4, wherein:
   said at least one device further includes a sieve device for the separation of large surface light rejects which is connected with the light reject outlet means of said secondary pulper; and
   return line means for recycling good stock obtained at said sieve device back to said stock pulper.

6. The apparatus as defined in claim 4, further including:
   a circulation pump arranged at said line means of said auxiliary circulation system between said separator means for the heavy rejects and said secondary pulper;
   said circulation pump serving to feed the stock suspension to said secondary pulper;
   connection line means for dilution water provided for said auxiliary circulation system; and
   said connection line means for the dilution water being connected with a portion of the line means of the auxiliary circulation system, which viewed in the direction of flow, is at a location forwardly of the separator means for the heavy rejects.

7. The apparatus as defined in claim 3, wherein:
   said at least one device further includes
   a sieve device for the separation of large surface light rejects which is connected with the light reject outlet means of said secondary pulper; and
   return line means for recycling good stock obtained at said sieve device back to said stock pulper.

8. The apparatus as defined in claim 1, further including:
   connection line means for dilution water provided for said auxiliary circulation system.

* * * * *